United States Patent
Marzolla et al.

(10) Patent No.: US 9,650,457 B2
(45) Date of Patent: May 16, 2017

(54) PROPYLENE BASED TERPOLYMERS

(71) Applicant: Basell Poliolefine Italia S.r.l., Milan (IT)

(72) Inventors: Roberta Marzolla, Ferrara (IT); Monica Galvan, Ferrara (IT); Tiziana Caputo, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/402,262

(22) PCT Filed: May 21, 2013

(86) PCT No.: PCT/EP2013/060347
§ 371 (c)(1),
(2) Date: Nov. 19, 2014

(87) PCT Pub. No.: WO2013/174778
PCT Pub. Date: Nov. 28, 2013

(65) Prior Publication Data
US 2015/0087770 A1    Mar. 26, 2015

Related U.S. Application Data

(60) Provisional application No. 61/649,621, filed on May 21, 2012.

(30) Foreign Application Priority Data

May 21, 2012 (EP) .................................... 12168621

(51) Int. Cl.
*C08F 210/06* (2006.01)
*C08F 210/16* (2006.01)
*C08J 5/18* (2006.01)
*C08L 23/14* (2006.01)

(52) U.S. Cl.
CPC ............. *C08F 210/06* (2013.01); *C08J 5/18* (2013.01); *C08F 210/16* (2013.01); *C08J 2323/12* (2013.01); *C08J 2323/14* (2013.01); *C08L 23/14* (2013.01); *C08L 23/142* (2013.01)

(58) Field of Classification Search
CPC ...... C08F 210/06; C08F 210/16; C08L 23/14; C08L 23/142; C08J 5/18; C08J 2323/14
USPC .................................. 526/348, 348.1, 348.6
See application file for complete search history.

(56) References Cited

U.S. PATENT DOCUMENTS

| | | | |
|---|---|---|---|
| 6,221,984 B1 | 4/2001 | Kersting et al. | |
| 6,388,040 B1 | 5/2002 | Fujita et al. | |
| 2009/0274921 A1* | 11/2009 | Ackermans | B32B 27/32 428/516 |
| 2010/0137505 A1* | 6/2010 | Cavalieri | C08F 210/06 524/579 |

FOREIGN PATENT DOCUMENTS

| | | |
|---|---|---|
| EP | 1209187 | 5/2002 |
| EP | 1941997 | 7/2008 |
| WO | WO2009019169 | 2/2009 |

OTHER PUBLICATIONS

PCT International Search Report & Written Opinion mailed Aug. 7, 2013, for PCT/EP2013/060347.

* cited by examiner

*Primary Examiner* — Roberto Rabago

(57) ABSTRACT

A propylene, ethylene, 1-butene terpolymer containing from 0.5 wt % to 2.2 wt % of ethylene derived units and from 6.0 wt % to 20.0 wt % of 1 butene derived units;

wherein:

i) the ratio C2 wt %/C4 wt % ranges from 0.09 to 0.06; wherein C2 wt % is the weight percent of ethylene derived units and C4 wt % is the weight percent of 1-butene derived units;

ii) the Melt flow rate ranges from 0.4 to 54 g/10 min;

iii) the xylene soluble fraction at 25° C. is lower than 15.0 wt % the minimum value being 5.0 wt %.

5 Claims, No Drawings

PROPYLENE BASED TERPOLYMERS

This application is the U.S. National Phase of PCT International Application PCT/EP2013/060347, filed May 21, 2013, claiming benefit of priority to European Patent Application No. 12168621.6, filed May 21, 2012, and benefit of priority under 35 U.S.C. §119(e) of U.S. Provisional Application No. 61/649,621 filed May 21, 2012, the contents of which are incorporated herein by reference in their entirety.

FIELD OF THE INVENTION

The present invention relates to a propylene, ethylene, 1-butene terpolymers having a good optical and mechanical properties and particular low sealing initiating temperature (SIT) on films.

BACKGROUND OF THE INVENTION

Films made of propylene copolymers or terpolymers are known in the art.

Propylene copolymers or terpolymers are used because, with respect to propylene homopolymers, are characterized by a better impact, lower rigidity and better transparency. In some cases however, it is difficult to find the acceptable balance between those properties, particularly when properties contrasting to each other are desired. When a certain softness is desired, for example, it is commonly obtained in the presence of high amount of xylene soluble fractions that make them unsuitable for food contact applications.

U.S. Pat. No. 6,221,984 discloses random copolymers of propylene with ethylene and at least one $C_4$-$C_{10}$ alpha-olefin and a process for preparing such random copolymers, which can be used in films, fibers or moldings. In particular, the terpolymers obtained by the process disclosed in this specification are particularly suitable for food packaging films because of their low proportions of xylene-soluble polymer particles (Examples 1-3) but are not suited for applications requiring a certain degree of softness.

On the other hand, when the xylene soluble fraction is increased (comparative examples 1 and 2) and softness is increased, the sealing initiation temperature and the optical properties become unsatisfactory.

WO 03/037981 discloses pipes made from at least a polypropylene composition obtained by a process carried out in a reactor comprising two interconnected polymerization zones.

Said process provides polypropylene compositions with high stiffness and impact resistance particularly suitable for pipes. When the propylene composition is a propylene-ethylene-butene-1 copolymer, the flexural modulus is higher than 700 MPa.

The propylene composition disclosed by WO 03/037981 cannot be used in the preparation of films when a certain degree of softness is required.

Furthermore, WO 98/58971 discloses a process for producing terpolymers of propylene, ethylene and other alpha-olefins comprising slurry and gas phase reactors connected together. The process comprises using a combination of two or more reactors connected in a cascade for producing a polymer product exhibiting a ratio of ethylene-to-butene less than 0.3. Such comonomer distribution gives a material having low soluble content in hexane and good optical properties.

The drawback related to the above mentioned terpolymer product is the too low melting temperature and the consequent narrow processability window. In fact, with respect to a given comonomer units content, the higher is the melting temperature of the copolymer, the wider is its processability window.

WO 2009/019169 relates to a propylene/ethylene/1-butene terpolymer prepared in a gas phase reactor comprising two interconnected polymerization zones. Said terpolymer has among other features the ration between ethylene amount (wt %) and 1-butene amount (wt %) ranging from 0.1 to 0.8 and a xylene soluble fraction at 25° C. higher than 9 wt %.

The applicant found that by lowering the ethylene/1-butene ratio (wt %/wt %) and the xylene soluble fraction it is possible to obtain a material having a low SIT, better transparency and lower hexane extractables. Thus making this material fit for films especially in food packaging.

SUMMARY OF THE INVENTION

An object of the present invention is a propylene, ethylene, 1-butene terpolymer containing from 0.5 wt % to 2.2 wt % preferably from 0.6 wt % to 1.9 wt %; more preferably from 0.7 wt % to 1.5 wt % of ethylene derived units and from 6.0 wt % to 20.0 wt %; preferably from 7.0 wt % to 16.2 wt %; more preferably from 8.5 wt % to 13.0 wt % of 1 butene derived units; wherein:
 i) the ratio C2 wt %/C4 wt % ranges from 0.12 to 0.06; preferably from 0.09 to 0.06; wherein C2 wt % is the weight percent of ethylene derived units and C4 wt % is the weight percent of 1-butene derived units;
 ii) the Melt flow rate ranges from 0.4 to 54 g/10 min, preferably from 1 to 22 g/10 min; more preferably from 2 to 15 g/10 min;
 iii) the xylene soluble fraction at 25° C. is lower than 15.0 wt %; preferably lower than 13.0 wt % more preferably lower than 12.0 wt %, even more preferably lower than 8.5 wt %, the minimum value being 5.0 wt %.

DETAILED DESCRIPTION OF THE INVENTION

For the term terpolymer in the present invention it is meant e polymer containing only propylene, ethylene and 1-butene derived units.

Preferably the terpolymer of the present invention has a fraction soluble in hexane (measured on 100 μm plaque) lower than 3.4 wt %, preferably lower than 3 wt % more preferably lower than 2.8 wt %.

Preferably the terpolymer of the present invention has the gloss measured on 50 μm film is higher than 88.0%, more preferably higher than 90.0% even more preferably higher than 92% such as a gloss higher than 93% or higher than 95.8%.

Preferably the terpolymer of the present invention has a sealing initiation temperature (SIT) lower than 110.0° C.; more preferably lower than 108.0° C., even more preferably the SIT is lower than 106.5° C.

The terpolymer of the present invention can be obtained with a polymerization process carried out in a gas-phase reactor comprising two interconnected polymerization zones.

A polymerization process carried out in a gas-phase polymerization reactor comprising at least two interconnected polymerization zones is described in the European patent EP 782587.

The process is carried out in a first and in a second interconnected polymerization zone to which propylene, ethylene and 1-butene are fed in the presence of a catalyst system and from which the polymer produced is discharged. The growing polymer particles flow through the first of said polymerization zones (riser) under fast fluidization conditions, leave said first polymerization zone and enter the second of said polymerization zones (downcomer) through which they flow in a densified form under the action of gravity, leave said second polymerization zone and are reintroduced into said first polymerization zone, thus establishing a circulation of polymer between the two polymerization zones. Generally, the conditions of fast fluidization in the first polymerization zone is established by feeding the monomers gas mixture below the point of reintroduction of the growing polymer into said first polymerization zone. The velocity of the transport gas into the first polymerization zone is higher than the transport velocity under the operating conditions and is normally between 2 and 15 m/s. In the second polymerization zone, where the polymer flows in densified form under the action of gravity, high values of density of the solid are reached which approach the bulk density of the polymer; a positive gain in pressure can thus be obtained along the direction of flow, so that it becomes possible to reintroduce the polymer into the first reaction zone without the help of mechanical means. In this way, a "loop" circulation is set up, which is defined by the balance of pressures between the two polymerization zones and by the head loss introduced into the system. Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases. The operating parameters such as, for example, the temperature are those that are usual in gas-phase olefin polymerization processes, for example between 50° C. and 120° C. The process can be carried out under operating pressure of between 0.5 and 10 MPa, preferably between 1.5 and 6 MPa.

Preferably, the various catalyst components are fed to the first polymerization zone, at any point of said first polymerization zone. However, they can also be fed at any point of the second polymerization zone. Molecular weight regulators known in the art, particularly hydrogen, can be used to regulate the molecular weight of the growing polymer.

By the use of the means described in WO00/02929 it is possible to totally or partially prevent that the gas mixture present in the riser enters the downcomer; in particular, this is preferably obtained by introducing in the downcomer a gas and/or liquid mixture having a composition different from the gas mixture present in the riser. According to a particularly advantageous embodiment of the present invention, the introduction into the downcomer of said gas and/or liquid mixture having a composition different from the gas mixture present in the riser is effective in preventing the latter mixture from entering the downcomer. Therefore, it is possible to obtain two interconnected polymerization zones having different monomer compositions and thus able to produce polymers with different properties.

Typically, when the propylene terpolymer is produced in the gas-phase polymerization reactor comprising the two interconnected polymerization zones, in accordance with WO 00/02929, the ethylene-reach polymerization zone is the riser.

In the riser, the molar concentration of ethylene (expressed as mole % with respect to the total amount of the monomers in the gas-phase) usually ranges from 0.5 to 5 mole %, preferably from 1 to 4 mole % and the molar concentration of the 1-butene ranges from 7 to 20 mole %, preferably from 9 to 18 mole %. When the barrier effect is not applied, the concentrations of the monomers in the downcomer are similar to those in the riser. Whereas, by virtue of the barrier effect provided by the gas and/or liquid feeding described above, the composition of the gas phase in the downcomer is less reach in ethylene and in general in the range of from 0.1-0.5 mole %, preferably from 0.2 to 0.4 mole %, whereas the content of the 1-butene ranges from 5 to 15 mole %, preferably from 6 to 13 mole %. In this case, the ratio between the ethylene content in the riser and that in the downcomer is typically higher than 3 and more typically higher than 4, whereas the ratio between the 1-butene content in the riser and that in the downcomer is typically higher than 1.1 and preferably ranges from 1.1 to 2.

The Ziegler-Natta catalysts suitable for producing the propylene terpolymers of the instant invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application WO00/63261.

Preferably, the solid catalyst component comprises Mg, Ti, halogen and an electron donor selected from mono- and diesters of aromatic dicarboxylic acids having the —COOH groups into ortho position, wherein at least one of the R hydrocarbyl radical of the —COOR groups contains from 1 to 20 carbon atoms. Particularly preferably the electron donor is selected from di-n-propyl, di-n-butyl, diisobutyl, di-n-heptyl, di-2-ethylhexyl, di-n-octyl, di-neopentil phthalates.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The internal donor can be added during the treatment with $TiCl_4$ and the treatment with the electron donor compound can be repeated one or more times. Generally, the internal electron donor compound is used in molar ratio with respect to the $MgCl_2$ of from 0.01 to 1 preferably from 0.05 to 0.5.

The preparation of catalyst components in spherical form is described for example in European patent application EP-A-395083 and in the International patent application WO98/44009. The solid catalyst components obtained according to the above method show a surface area (by B.E.T. method) generally between 20 and 500 m$^2$/g and preferably between 50 and 400 m$^2$/g, and a total porosity (by B.E.T. method) higher than 0.2 cm$^3$/g preferably between 0.2 and 0.6 cm$^3$/g. The porosity (Hg method) due to pores with radius up to 10.000 Å generally ranges from 0.3 to 1.5 cm$^3$/g, preferably from 0.45 to 1 cm$^3$/g.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkyl-aluminum sesquichlorides such as AlEt$_2$Cl and Al$_2$Et$_3$Cl$_3$.

Preferred external electron-donor compounds include silicon compounds, esters such as ethyl 4-ethoxybenzoate, heterocyclic compounds and particularly 2,2,6,6-tetramethyl piperidine and ketones. Another class of preferred external donor compounds is that of silicon compounds of formula R$_a^5$R$_b^6$Si(OR$^7$)$_c$, where a and b are integer from 0 to 2, c is an integer from 1 to 3 and the sum (a+b+c) is 4; R$^5$, R$^6$, and R$^7$, are alkyl, cycloalkyl or aryl radicals with 1-carbon atoms optionally containing heteroatoms. Particularly preferred are methylcyclohexyldimethoxysilane, diphenyldimethoxysilane, diisopropyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1,trifluoropropyl-metil-dimethoxysilane. The external electron donor compound is used in such an amount to give a molar ratio between the organo-aluminum compound and said electron donor compound of from 0.1 to 500.

The catalytic system can be pre-contacted (pre-polymerized) with small amounts of olefins. The molecular weight of the propylene terpolymers can be regulated by using known regulators, such as hydrogen.

The terpolymer of the present invention is particularly suitable for applications such cast films and oriented films, BOPP films, heat-sealable films and all the applications requiring heat sealability and softness. Such propylene terpolymers have a good balance between optical properties and sealing properties combined with good shrinkage properties and softness. Due to the particularly low hexane extractables these films can be conveniently used for food packaging.

The propylene terpolymers of the invention might further comprise at least one nucleating agent. Preferably, the propylene terpolymers comprise up to 2500 ppm, more preferably from 500 to 2000 ppm, of at least one nucleating agent.

The propylene terpolymers comprising at least one nucleating agent are particularly suitable for producing blown films.

The at least one nucleating agent can be selected among inorganic additives such as talc, silica or kaolin, salts of monocarboxylic or polycarboxylic acids, e.g. sodium benzoate or aluminum tert-butylbenzoate, dibenzylidenesorbitol or its C$_1$-C$_8$-alkyl-substituted derivatives such as methyldibenzylidenesorbitol, ethyldibenzylidenesorbitol or dimethyldibenzylidenesorbitol or salts of diesters of phosphoric acid, e.g. 2,2'-methylenebis(4,6,-di-tert-butylphenyl)phosphate sodium or lithium salt. Particularly preferred nucleating agents are 3,4-dimethyldibenzylidenesorbitol; alumi-num-hydroxy-bis[2,2'-methylene-bis(4,6-di-t-butylphenyl) phosphate]; sodium 2,2'-methylene-bis(4,6-ditertbutylphenyl)phosphate and bicyclo[2.2.1]heptane-2,3-dicarboxylic acid, disodium salt (1R,2R,3R,4S) and HPN-20E that contains Zinc compounds and 1,2-cyclohexanedicarboxylic acid calcium salt. The at least one nucleating agent may be added to the propylene terpolymer by known methods, such as by melt blending the at least one nucleating agent and the propylene terpolymer under shear condition in a conventional extruder.

The propylene terpolymers obtained by the process of the present invention may then be added with additional additives commonly employed in the polyolefin field, such as antioxidants, light stabilizers, antiacids, colorants and fillers.

The following not-limiting examples are given to better illustrate the present invention.

EXAMPLES

The following characterization methods were used in testing the propylene terpolymers produced.

Determination of the Comonomer Content:

The comonomers content have been determined by infrared spectroscopy by collecting the IR spectrum of the sample vs. an air background with a Fourier Transform Infrared spectrometer (FTIR) the instrument data acquisition parameters are:

purge time: 30 seconds minimum
collect time: 3 minutes minimum
apodization: Happ-Genzel
resolution: 2 cm-1.

Sample Preparation:

Using a hydraulic press, a thick sheet is obtained by pressing about g 1 of sample between two aluminum foils. If homogeneity is in question, a minimum of two pressing operations are recommended. A small portion is cut from this sheet to mold a film. Recommended film thickness ranges between 0.02-:0.05 cm (8-20 mils).

Pressing temperature is 180±10° C. (356° F.) and about 10 kg/cm2 (142.2 PSI) pressure for about one minute. Release the pressure and remove from the press and cool the sample to room temperature.

The spectrum of a pressed film of the polymer is recorded in absorbance vs. wavenumbers (cm-1). The following measurements are used to calculate ethylene and 1-butene content:

Area (At) of the combination absorption bands between 4482 and 3950 cm-1 which is used for spectrometric normalization of film thickness.

Area (AC2) of the absorption band between 750-700 cm-1 after two proper consecutive spectroscopic subtractions of an isotactic non additivate polypropylene spectrum and then of a reference spectrum of an 1-butene-propylene random copolymer in the range 800-690 cm-1.

Height (DC4) of the absorption band at 769 cm$^{-1}$ (maximum value), after two proper consecutive spectroscopic subtractions of an isotactic non additivate polypropylene spectrum and then of a reference spectrum of an ethylene-propylene random copolymer in the range 800-690 cm-1.

In order to calculate the ethylene and 1-butene content calibration straights lines for ethylene and 1-butene obtained by using samples of known amount of ethylene and 1-butene are needed:

Calibration of ethylene:
Calibration straight line is obtained by plotting AC2/At versus ethylene molar percent (% C2m). The slope GC2 is calculated from a linear regression.
Calibration of 1-butene
A calibration straight line is obtained by plotting DC4/At versus butene molar percent (% C4m). The slope GC4 is calculated from a linear regression.
Spectrum of the unknown sample is recorded and then (At), (AC2) and (DC4) of the unknown sample are calculated. The ethylene content (% molar fraction C2m) of the sample is calculated as follows:

$$\% \ C2m = \frac{1}{Gc2} \cdot \frac{Ac2}{At}$$

The 1,butene content (% molar fraction C4m) of the sample is calculated as follows:

$$\% \ C4m = \frac{1}{G_{C4}} \cdot \left( \frac{A_{C4}}{A_t} - I_{C4} \right)$$

The propylene content (molar fract C3m) is calculated as follows:

$C3m = 100 - \% \ C4m - \% \ C2m$

The ethylene, 1-butene contents by weight are calculated as follows:

$$\% \ C2 \ wt = 100 \cdot \frac{28 \cdot C2m}{(56 \cdot C4m + 42 \cdot C3m + 28 \cdot C2m)}$$

$$\% \ C4 \ wt = 100 \cdot \frac{56 \cdot C4m}{(56 \cdot C4m + 42 \cdot C3m + 28 \cdot C2m)}$$

Solubility in Xylene:
2.5 g of polymer are dissolved in 250 ml of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble and insoluble at room temperature (25° C.)
Melt Flow Rate (MFR"L"):
Determined according to ISO 1133230° C., 2.16 kg.
Flexural Modulus:
Determined according to the ISO 178 method.
Melting Temperature:
Melting temperature and crystallization temperature: Determined by differential scanning calorimetry (DSC). weighting 6±1 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, melting temperatures and crystallization temperatures are read.
Hexane Soluble on Film:
Determined according to FDA 177, 1520, by suspending in an excess of hexane a 100 µm thick film specimen of the composition being analyzed, in an autoclave at 50° C. for 2 hours. Then the hexane is removed by evaporation and the dried residue is weighed.
Sealing Initiation Temperature (S.I.T.):
Determined as follows.
Preparation of the Film Specimens
Some films with a thickness of 50 µm are prepared by extruding each test composition in a single screw Collin extruder (length/diameter ratio of screw: 25) at a film drawing speed of 7 m/min. and a melt temperature of 210-250° C. Each resulting film is superimposed on a 1000 µm thick film of a propylene homopolymer having an isotacticity index of 97 and a MFR L of 2 g/10 min. The superimposed films are bonded to each other in a Carver press at 200° C. under a 9000 kg load, which is maintained for 5 minutes.
The resulting laminates are stretched longitudinally and transversally, i.e. biaxially, by a factor 6 with a TM Long film stretcher at 150° C., thus obtaining a 20 µm thick film (18 µm homopolymer+2 µm test composition).
2×5 cm specimens are cut from the films.
Determination of the S.I.T.
For each test two of the above specimens are superimposed in alignment, the adjacent layers being layers of the particular test composition. The superimposed specimens are sealed along one of the 5 cm sides with a Brugger Feinmechanik Sealer, model HSG-ETK 745. Sealing time is 0.5 seconds at a pressure of 0.1 N/mm2 The sealing temperature is increased for each seal, starting from about 10° C. less than the melting temperature of the test composition. The sealed samples are left to cool and then their unsealed ends are attached to an Instron machine where they are tested at a traction speed of 50 mm/min.
The S.I.T. is the minimum sealing temperature at which the seal does not break when a load of at least 2 Newtons is applied in the said test conditions.
Haze (on 50 µm mm Plaque):
Determined on 50 µm thick cast films of the test composition. The measurement was carried out on a 50×50 mm portion cut from the central zone of the film.
The instrument used for the test was a Gardner photometer with Haze-meter UX-10 equipped with a G.E. 1209 lamp and filter C. The instrument calibration was made by carrying out a measurement in the absence of the sample (0% Haze) and a measurement with intercepted light beam (100% Haze).
Gloss on Film
Determined on the same specimens as for the Haze.
The instrument used for the test was a model 1020 Zehntner photometer for incident measurements. The calibration was made by carrying out a measurement at incidence angle of 60° on black glass having a standard Gloss of 96.2% and a measurement at an incidence angle of 45° on black glass having a standard Gloss of 55.4%.

Examples 1-2

Propylene terpolymers are prepared by polymerising propylene, ethylene and butene-1 in the presence of a highly stereospecific Ziegler-Natta catalyst.
The Ziegler-Natta catalyst was prepared according to the Example 5, lines 48-55 of the European Patent EP728769.

Triethylaluminium (TEA) was used as co-catalyst and dicyclopentyldimethoxysilane as external donor, with the weight ratios indicated in Table 1.

The above catalyst system is then transferred into a reactor containing an excess of liquid propylene and propane to carry out prepolymerisation at 25° C. for 11 minutes before introducing it into a polymerisation reactor.

The propylene terpolymers of the examples were prepared in a single gas-phase polymerization reactor comprising two interconnected polymerization zones, a riser and a downcomer, as described in the European Patent EP782587 and WO00/02929.

Into the polymerisation reactor the propylene terpolymers are produced by feeding in a continuous and constant flow the prepolymerized catalyst system, hydrogen (used as molecular weight regulator), propylene, ethylene and butene-1 in the gas state (the feeding quantities expressed in mol % are shown in table 1). The polymer particles exiting from the polymerization step were subjected to a steam treatment to remove the unreacted monomers and dried.

The other operative conditions are indicated in Table 1.

Comparative Example 3

The propylene terpolymer of the Comparative Example 3 is the propylene terpolymer according to the Example 3 of the PCT Patent Application WO 2009/019169.

Table 1 shows the process parameters of the polymerization of the propylene terpolymers of the examples 1-2.

Table 2 shows the properties measured on the propylene terpolymers produced in the examples 1-2 and comparative example 3.

TABLE 1

| | Ex | |
|---|---|---|
| | 1 | 2 |
| Temperature, ° C. | 15 | 15 |
| Residence time, min | 12 | 13 |
| Catalyst, g/h | 14 | 13.5 |
| TEA/CAT, g/g | 5 | 5 |
| TEA/Ext. Donor, g/g | 4 | 4 |
| PREPOLYMERIZATION | | |
| Temperature, ° C. | 20 | 20 |
| Residence time, min | 5 | 5 |
| POLYMERIZATION | | |
| Temperature, ° C. | 72 | 71 |
| Pressure, barg | 21.5 | 21 |
| C3, mole % | 74 | 77 |
| C2, mole % | 0.7 | 0.65 |

TABLE 1-continued

| | Ex | |
|---|---|---|
| | 1 | 2 |
| C4, mole % | 14.5 | 15.5 |
| $H_2/C_3^-$, mol ratio | 0.007 | 0.007 |

C3 propylene, C2 ethylene C4 1-butene

TABLE 2

| | Example | | |
|---|---|---|---|
| | 1 | 2 | Comp 3 |
| Ethylene content, wt % | 0.9 | 0.9 | 1.20 |
| Butene content, wt % | 10.4 | 11 | 11.3 |
| Ethylene to Butene-1 ratio | 0.086 | 0.081 | 0.11 |
| XS, wt % | 8.5 | 9.2 | 19.6 |
| MFR, g/10 min | 6.1 | 5.1 | 5.1 |
| Melting Temperature, ° C. | 130.5 | 128.6 | 130.4 |
| SIT, ° C. | 106 | 106 | 107.4 |
| Hexane extractable on plaque, wt % | 1.8 | 2.0 | 2.8 |
| Haze on 50 μm film, % | 0.1 | 0.2 | 0.2 |
| Gloss on 50 μm film, % | 96.8 | 96.5 | 90.8 |
| Flexural modulus, MPa | 670 | 655 | 663 |

The terpolymer of the present invention having a low C2 wt %/C4 wt % shows an improved SIT together with improved optical properties and comparable flexural modulus with respect to the comparative example but having a lower amount of xylene extractables.

What is claimed is:

1. A terpolymer comprising:
   (A) 0.5-2.2 wt. % of ethylene derived units;
   (B) 6.0-20.0 wt. % of 1-butene derived units; and
   (C) 77.8 to 93.5 wt. % of propylene derived units,
   wherein the terpolymer comprises:
   i) a weight ratio of ethylene derived units to 1-butene derived units ranges from 0.06-0.09;
   ii) a melt flow rate from 0.4 to 54 g/10 min; and
   iii) 5 to lower than 15 wt. % by weight of a xylene soluble fraction at 25° C.; and
   iv) a fraction soluble in hexane as measured on a 100 μm plaque of lower than or equal to 2.0 wt. %.

2. The terpolymer according to claim 1, wherein the terpolymer has a sealing initiation temperature (SIT) lower than 110.0° C.

3. A film comprising the terpolymer of claim 1.

4. The film according to claim 3, comprising a nucleating agent.

5. The terpolymer according to claim 1, wherein the terpolymer comprises:
   (A) 0.6-1.9 wt. % of ethylene derived units; and
   (B) 7.0-16.2 wt. % of 1-butene derived units.

* * * * *

UNITED STATES PATENT AND TRADEMARK OFFICE
CERTIFICATE OF CORRECTION

PATENT NO. : 9,650,457 B2
APPLICATION NO. : 14/402262
DATED : May 16, 2017
INVENTOR(S) : Roberta Marzolla et al.

It is certified that error appears in the above-identified patent and that said Letters Patent is hereby corrected as shown below:

In the Specification

| | | |
|---|---|---|
| Column 5 | Line 26 | Delete "1-carbon" and insert --1-18 carbon-- |
| Column 6 | Line 32 | Delete "cm-1." and insert --$cm^{-1}$.-- |
| Column 6 | Line 42 | Delete "kg/cm2" and insert --$kg/cm^2$-- |
| Column 6 | Line 46 | Delete "(cm-1)." and insert --($cm^{-1}$).-- |
| Column 6 | Line 49 | Delete "(At)" and insert --($A_t$)-- |
| Column 6 | Line 50 | Delete "cm-1" and insert --$cm^{-1}$-- |
| Column 6 | Line 52 | Delete "(AC2)" and insert --($A_{C2}$)-- |
| Column 6 | Line 53 | Delete "cm-1" and insert --$cm^{-1}$-- |
| Column 6 | Line 57 | Delete "cm-1." and insert --$cm^{-1}$.-- |
| Column 6 | Line 58 | Delete "(DC4)" and insert --($D_{C4}$)-- |
| Column 6 | Line 63 | Delete "cm-1." and insert --$cm^{-1}$.-- |
| Column 7 | Line 2 | Delete "AC2/At" and insert --$A_{C2}/A_t$-- |
| Column 7 | Line 4 | Delete "GC2" and insert --$G_{C2}$-- |
| Column 7 | Line 6 | Delete "DC4/At" and insert --$D_{C4}/A_t$-- |
| Column 7 | Line 7 | Delete "GC4" and insert --$G_{C4}$-- |
| Column 7 | Line 10 | Delete "(At), (AC2) and (DC4)" and insert --($A_t$), ($A_{C2}$) and ($D_{C4}$)-- |
| Column 7 | Line 15 | Delete " $\% \ C2m = \frac{1}{Gc2} \cdot \frac{Ac2}{At}$ " and insert -- $\% C2m = \frac{1}{Gc2} \cdot \frac{Ac2}{At}$ -- |
| Column 7 | Line 18 | Delete "1,butene" and insert --1-butene-- |
| Column 7 | Line 25 | Delete "fract" and insert --fraction-- |
| Column 7 | Line 50 | Delete "1133230°" and insert --1133 230°-- |
| Column 8 | Line 30 | Delete "N/mm2" and insert --$N/mm^2$-- |

Signed and Sealed this
Twenty-eighth Day of January, 2020

Andrei Iancu
*Director of the United States Patent and Trademark Office*